June 25, 1968  D. H. WILLIAMS ET AL  3,389,519
SPACED FOAM CORE PANELS

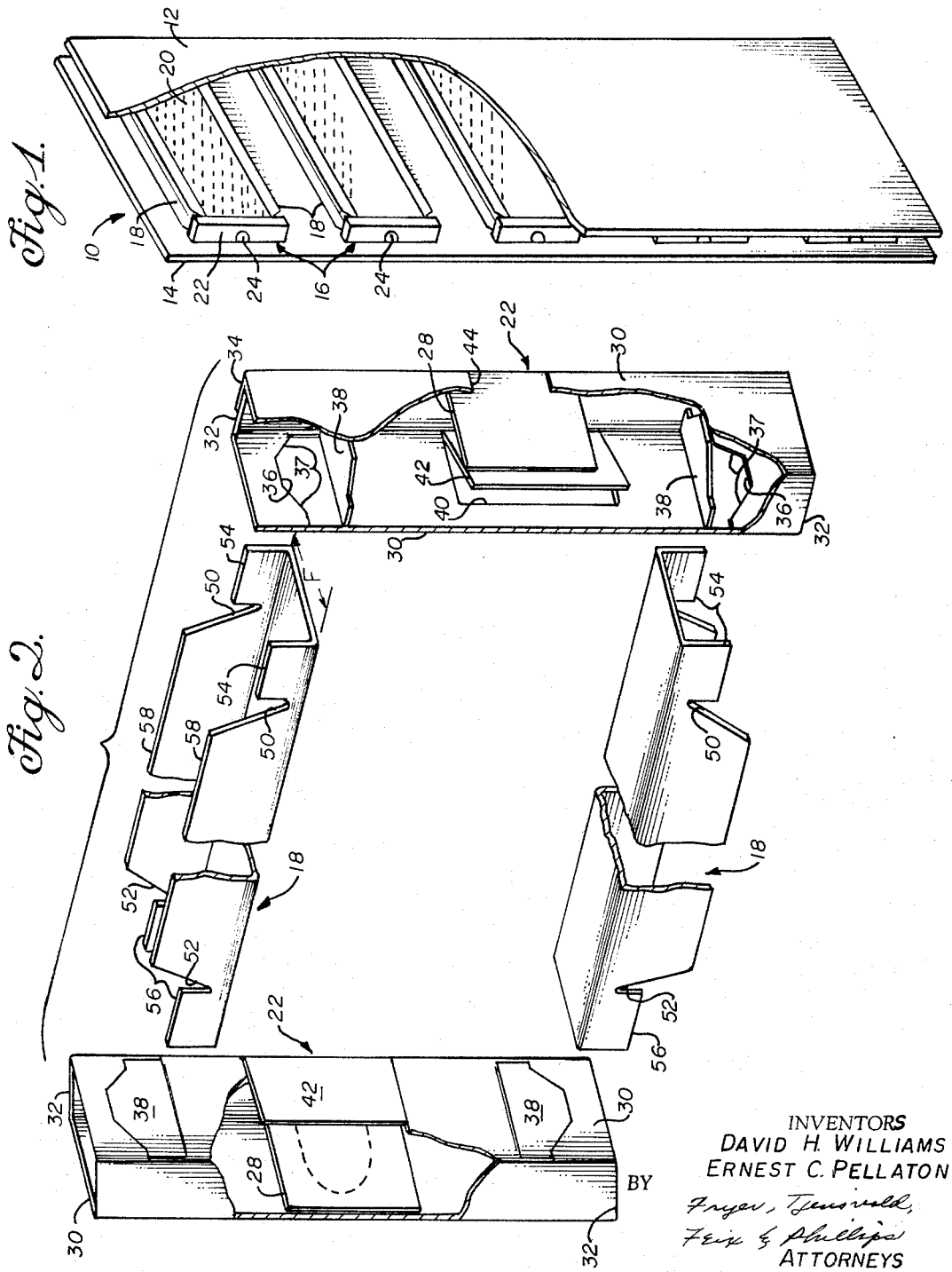

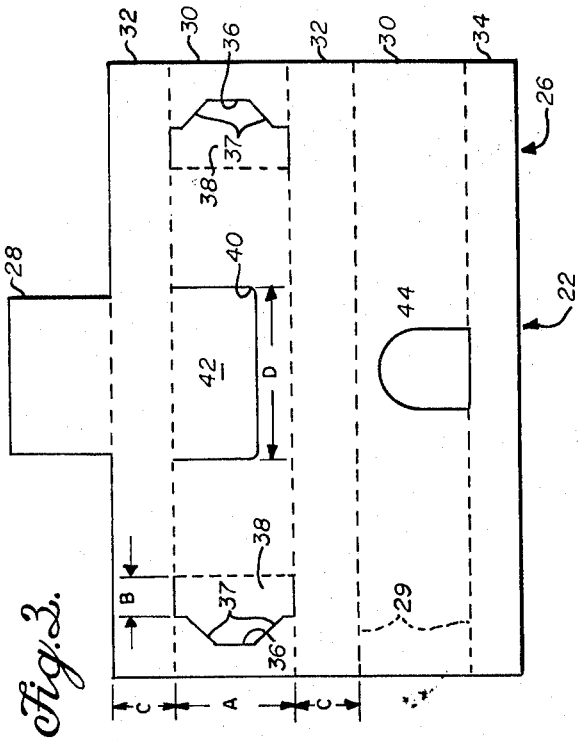
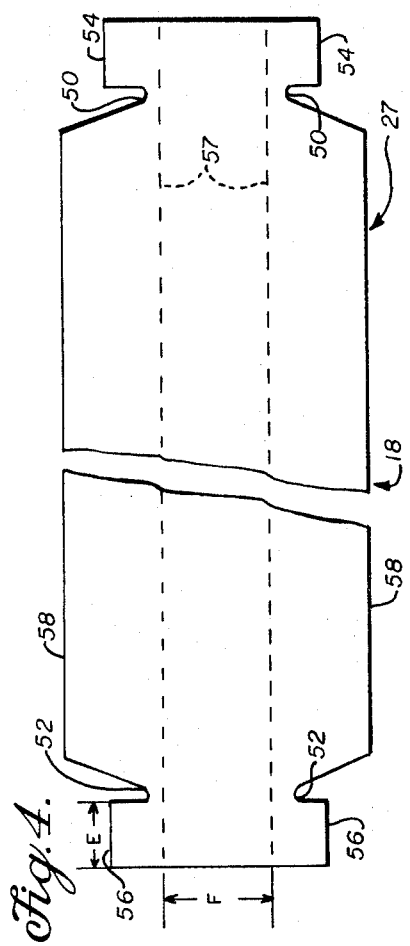
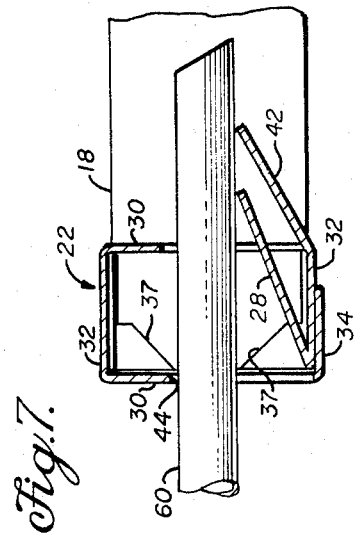
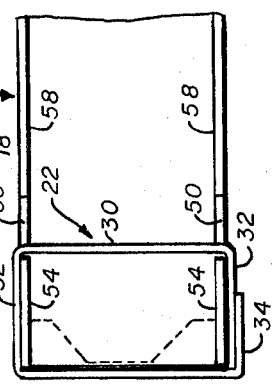

Filed March 9, 1966  3 Sheets-Sheet 3

INVENTORS
DAVID H. WILLIAMS
ERNEST C. PELLATON
BY Fryer, Tjensvold,
Feix & Phillips
ATTORNEYS

United States Patent Office 3,389,519
Patented June 25, 1968

3,389,519
SPACED FOAM CORE PANELS
David H. Williams, Sunnyvale, and Ernest C. Pellaton, Larkspur, Calif., assignors to Fibreboard Paper Products Corporation, San Francisco, Calif., a corporation of Delaware
Filed Mar. 9, 1966, Ser. No. 532,941
9 Claims. (Cl. 52—309)

ABSTRACT OF THE DISCLOSURE

A prefabricated, structural panel comprising first and second surface panels rigidly bonded together and spaced apart by a series of discontinuous spaced core portions. Said cores are comprised of expendable forms which serve to contain a rigid adhesive foamable material therein. The foamable material bonds the first and second surface panels together to form the structural unit.

---

The present invention relates generally to prefabricated, laminated wall panels of high strength and light weight, and more particularly to a composite structural panel utilizing expendable forms for in situ foaming of a series of cores therein, and the process for fabricating such panels.

There are at present many varieties of prefabricated panels available for use in constructing buildings, trailers, vehicles and the like, which employ various forms of laminations or composite layers of outer facing sheets, inner foamed sheets, preformed plastic or rubber strips, sheets or spacers, etc. For example, there are panels formed of two parallel facing sheets of hardboard or plasterboard separated about their entire periphery by a spacer form member, the entire volume being filled with an adhesive foam substance, such as polyurethane. Other panels are formed of two parallel sheets, or skins, of surface facing material, between which is glued preformed strips or cores of lightweight, rigid plastic material such as Styrofoam, for example, in selected widths and configurations. The majority of prior art panels are either difficult to construct or fabricate in that they require extensive, complex and relatively cumbersome molds and apparatus for baking, pressing, laminating and otherwise handling the panels, and/or they require the use of excessive amounts of adhesive, foamable resin substances which are prohibitively expensive.

In addition, many prior art lightweight, faced panels, which are used in applications wherein lateral stresses are to be experienced, are constructed to withstand such forces by increasing the uniform density and thus the strength of the core, or by increasing the thickness of the panel and thus its resistance to buckling. Either of these measures add undesirably to the total weight, as well as expense, of the panel. Still other panel constructions employ complicated processes and apparatus for forming foamed cores of varying cross-sectional densities in order to obtain optimum strength in precise regions or portions of the panel.

The present invention provides a lightweight, strong and relatively inexpensive panel which, due to its unique "lost form" or expendable form construction, lends itself to relatively simple fabrication techniques employing a minimum of molds and associated apparatus.

Accordingly, it is an object of the invention to provide a composite, lightweight structural panel and a process for fabricating same.

It is another object of the invention to provide a composite structural panel utilizing an expendable or "lost form" type of construction, i.e., wherein the form used to define the interior cores of the panel are not removed but become a permanent part of the panel construction.

It is still another object of the invention to provide a structural panel having an interior volume only partially filled with an adhesive foamable resin material to form discontinuous, foamed spacer cores in select configurations within the panel.

It is a further object of the invention to provide a rigid, lightweight, fireproof panel of sound-deadening qualities, low cost and relatively simple construction.

It is yet a further object of the invention to provide an expendable form assembly for use in structure fabrication of such structures as panels and the like, the form assembly including a self-closing aperture device, and being adapted to fold flat for ease in transporting same.

It is another object of the invention to provide a method for fabricating a composite, expendable type of structural panel, utilizing a minimum of apparatus, and in fact, wherein the panel can be constructed in large part by hand at the site of a construction job.

Other objects and advantages will become apparent from the following specification and claims, taken in conjunction with the accompanying drawings, in which:

FIG. 1 is a perspective, partially broken-out view of a panel of the invention, exemplifying the expendable form type of construction.

FIG. 2 is a perspective, exploded view of an expendable form of the invention, with the components thereof in position for assembly.

FIG. 3 is a view of a swing valve end-piece of the expendable form, prior to being folded and assembled, showing a preferred pattern for the construction thereof.

FIG. 4 is a view of a lateral strip of the expendable form prior to folding thereof.

FIG. 6 is an end view taken along lines 6—6 of FIG. 5.

FIG. 7 is a cross-section view taken along lines 7—7 of FIG. 5.

Figure 5:
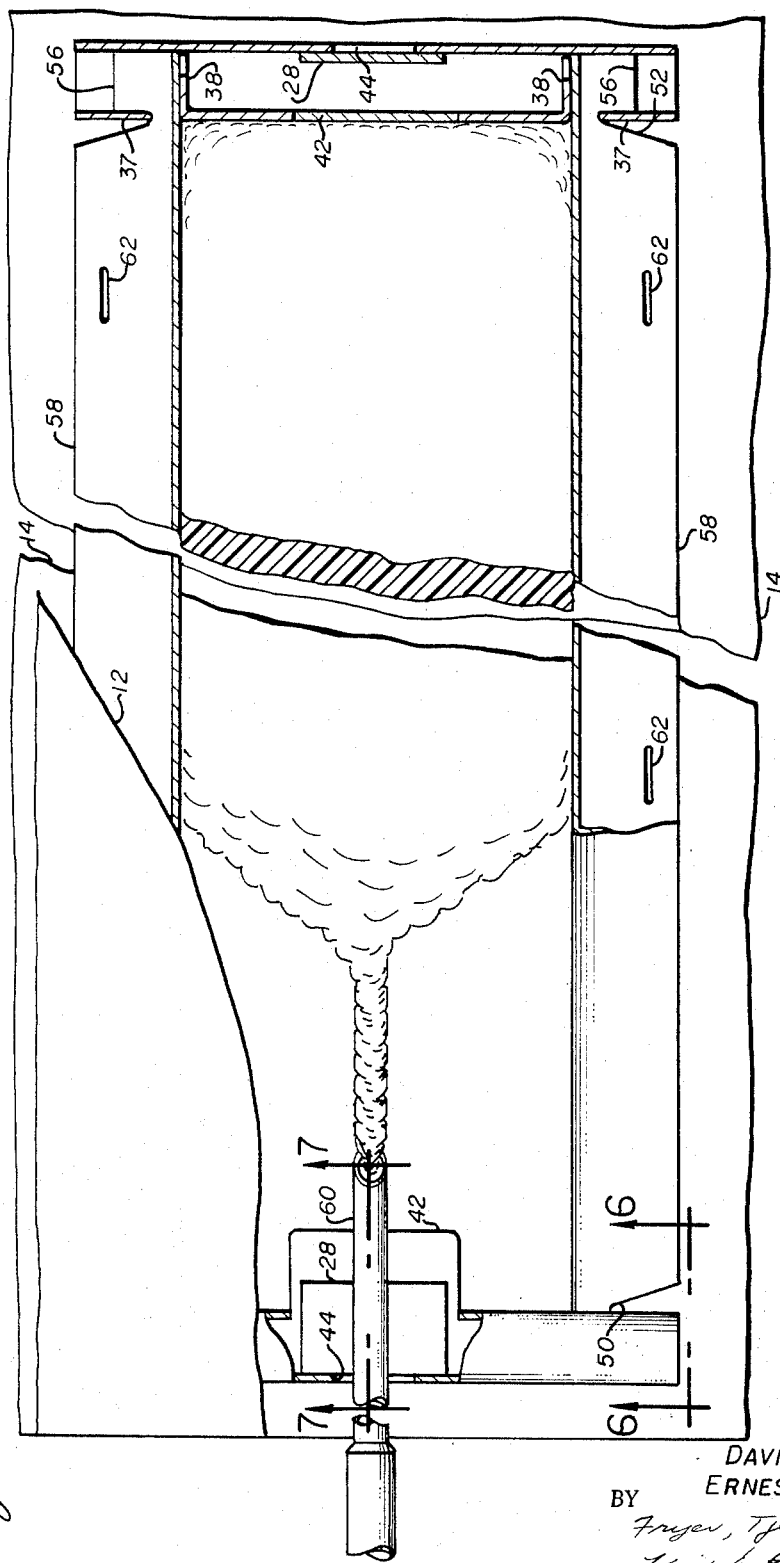
FIG. 5 is a partial cross-section view of an expendable form of the invention upon assembly.

Referring to FIG. 1, there is shown by way of example only, a panel 10 of the invention, exemplifying one configuration thereof, and employing two parallel sheets of surface facing material, such as plasterboard, hardboard, plyboard or other wallboard, disposed in register one to another to form the skins 12, 14 of the panel 10. The sheets, hereinafter termed skins 12, 14, are spaced apart in rigid construction by means of expendable forms 16 disposed in preferably parallel relation at spaced intervals within the skins 12, 14. Although the expendable forms 16 are shown in parallel relation extending across the shorter dimension of the skins 12, 14, it is to be understood that any of various configurations or patterns could be used within the spirit of the invention. For example, the forms 16 could be disposed along the longer dimension of the skins 12, 14, or alternately staggered in overlapping configuration, etc.; the disposition of the forms and resulting construction of the panel 10 being regulated by its intended use.

The expendable forms 16 are formed of two lateral strips 18 spaced apart a preselected distance, depending on the width desired for individual cores 20 formed of an adhesive, foamable resin material. The strips 18 are demountably locked in position by securing them to end pieces, hereinafter termed swing valves 22, in a manner further described infra. Thus, the strips 18 and box valves 22 form the sides and ends respectively of the individual, expendable forms 16. The entire form 16 is made of light weight and inexpensive, foldable material, preferably cardboard, which upon being injected with an adhesive foamable resin core material is left within the panel as a permanent part thereof. The core 20 of previous mention is formed of any of the various adhesive foamable resin materials known in the art, the preferred material being polyurethane.

Polyurethane raw materials are readily available on the commercial market. Generally speaking, the basic ingredients to produce polyurethane foams are purchased in two component systems. One of the components is the liquid resin in the unpolymerized form, while the other component is the polymerizing or curing agent. Both components are stable when uncombined, but upon mixing, a chemical reaction is automatically induced, causing polymerization and subsequent curing of the polyurethane resin.

If the proper curing agent is selected, bubbles are produced within the mixed mass, whereby a stable foamed polymerized product is produced. In other systems, a "blowing agent" is introduced into one of the components, which upon mixing, produces bubbles within the polymerizing mass to create a foamed cured product. In any event these polyurethane raw materials are selected from readily available commercial products to provide a system for the production of a stable rigid polyurethane foam.

Such materials are formed by combining the aforesaid constituents in preselected proportions, whereupon, through chemical reaction, foaming occurs and the volume taken up by the material increases. Upon curing, the rigid, lightweight foamed cores 20 are formed within their respective expendable forms 16. For simplicity of description and by way of example only, the use of polyurethane material as the adhesive foamable resin material will be employed herein.

Briefly, the panel of FIG. 1 is fabricated by first laying down the skin 14 and disposed the plurality of expendable forms 16 thereon in the desired configuration. The forms 16 are secured to the skin 14 by any of various means, such as staples or gluing, to hold same in place thereon. Thereafter, the skin 12 is placed upon the forms 16 in register with the skin 14, where it is held in place by its own weight. If so desired, skin 12 may be held in place by application of pressure via weights or a press apparatus.

The polyurethane mixture is thereupon injected in liquid form into the volume enclosed within the forms 16 and the skins 12, 14, via a self-closing aperture means 24 formed in the swing valves 22. The mixture is allowed to react, filling the volume with the foamable material which upon curing forms the cores 20 rigidly bonded to all exposed surfaces of the forms 16 and skins 12, 14.

The polyurethane material can be mixed and introduced to the forms 16 by any of various known processes, and is preferably injected into the forms by inserting a long nozzle into the volume via the self-closing aperture means 24, and ejecting the material from the nozzle and into the volume immediately upon mixing the constituents by suitable apparatus (not shown).

The quantity and disposition of the material injected into the volume is regulated to provide the right amount of foamed material to insure the homogeneous filling of the volume, and thus a homogeneous core 20. A slight excess of material can be used to insure a homogeneous core due to pressure buildup, wherein any excess material is by-passed into the swing valve 22, as hereinafter shown.

The foamed polyurethane material has an adhesive quality and adheres or bonds tightly to not only the forms 16 but to the skins 12, 14 as it cures, to provide the lightweight, rigid cores 20 bonded individually to the skins.

Note in the panel construction that the ends of the forms 16 are recessed a short distance from the edges of the skins 12, 14. This is to simplify the construction of the wall or structure by allowing the panel 10 to be simply slipped between confining studs and secured thereto by nails hammered through the edges of the skins 12, 14.

Regarding now the expendable forms 16 of previous mention, shown in greater detail in FIG. 2, same comprise the lateral strips 18 formed preferably of a heavyweight or corrugated cardboard, and swing valves 22 formed preferably of a relatively lighter weight pressed cardboard. Configurations exemplifying a preferred design for the valves 22 and the strips 18 are shown prior to folding and/or gluing in the form of patterns 26 and 27 in FIGS. 3 and 4 respectively, by way of example only.

Accordingly, referring to FIGS. 2 and 3, the end-piece swing valve 22 is made of a rectangular piece of cardboard with an integral, protruding tab formed thereto, defining a valve flapper 28, further described infra. The rectangular piece of cardboard is scored along its length at spaced, parallel intervals, as shown by dashed lines 29, to form two opposing side walls 30 and two opposing edge walls 32 respectively, as well as an overlapping assembly flap 34 along the edge opposite that of the flapper 28.

Strip receiving lock slots 36 having a width substantially equal to a width A of the side walls 30, are formed at either end of the side wall 30 nearest the flapper 28. The lock slots 36 are preferably formed with stepped shoulders 37 which receive portions of the strips 18 to lock same in place as hereinafter described. Tabs 38 formed in making the slots 36 are not punched out entirely, but only along three sides to allow them to hinge from the fourth side thereof nearest the swing valve central region. Note that the lengths B of the tabs 38 are substantially equal to the width of the edge walls 32 and thus of a depth C of the valve 22. At such time as the expendable forms 16 are assembled the tabs 38 are pushed into the box-like swing valve 22, thereby tending to shape and retain the valve in a substantially rectangular, box-like configuration.

An aperture 40 preferably of rectangular shape, is formed substantially midway in the same side wall 30 wherein lock slots 36 are located, forming a flap 42 which hinges along the side thereof lying along the scored fold line between the side wall 30 and the edge wall 32 to which the flapper 28 is formed. The width D of the flap 42 is slightly larger than the corresponding width of the flapper 28, to allow the latter to pivot into the aperture 40.

An aperture 44, herein termed a valve seat aperture, is formed in the opposing side wall 30, preferably adjacent the scored fold line which extends between the side wall and the overlapping assembly flap 34, by punching out completely that portion of cardboard forming the aperture.

The end-piece swing valve 22 shown in unfolded pattern form in FIG. 3, is assembled by folding it inwardly along the scored lines 29 to define the rectangular box-like configuration, having side and edge walls 30, 32 respectively. The overlapping assembly flap 34 is superimposed on the respective edge wall 32, and the two are preferably glued, stapled, or otherwise securely fastened together to form the swing valve 22.

Upon assembly, the valve flapper 28 is disposed in register over the valve seat aperture 44 to provide a hinged or swinging flap or clapper for closing off the aperture 44. Due to the resistance to bending of the cardboard valve flapper 28, the flapper 28-aperture 44 tends to provide a self-closing or "normally-closed" condition and thus the self-closing aperture means 24 of previous mention.

Referring to FIGS. 2 and 4, the lateral strips 18 are formed of elongated pieces of corrugated cardboard, shaped at either ends thereof to define pairs of opposing notches 50, 52, to form thus pairs of laterally extending lock tabs 54, 56 respectively. The width E of the lock tabs 54, 56 is made equal to, or slightly less than, the depth C of the swing valve 22, such that respective ends of the strips 18 fit snugly in locked relation within the slots 36 of the valves 22. To this end, the strips 18 are folded twice along spaced, parallel, scored fold lines extending their length, and shown as dashed lines 57, to form a "U" shaped cross section having parallel reinforcing wall members 58. The width F of the strips 18 is substantially equal to the width A of the edge walls 32 and thus of the aperture 36. It may be seen that the wall members 58 of the strips 18, due to their resistance to yield to bending upon being folded, tend to spread apart to press outwardly against the confined skins 12, 14 upon assembly of the panel 10. This provides a sealing action between the lateral strips 18 and the skins 12, 14 to retain the polyurethane material.

FIG. 2 shows the components of the expendable form 16 prior to assembly, and shows one valve 22 in substantially flattened form. Accordingly, although the valve 22 is glued and assembled, ready for use, it can be folded flat for packing and transportation. Likewise the strips 18 are packed and transported flat prior to folding.

At such time as the forms 16 are to be assembled, the valves 22 are re-formed into the box-like configuration and held thus by tabs 38 as previously described. The strips 18 are folded along the scored lines 57 to define a "U" cross section with substantially parallel reinforcing wall members 58, and the tabs 54, 56 are pinched further together and pushed into respective lock slots 36.

The widths F of the respective ends of the strips 18 lie flat against the tabs 38 with the ends thereof abutting against the far side wall 30 of the respective valve 22. The lock tabs 52, 54 tend to spring back to a parallel relation to this shoulder against respective stepped shoulders 37 formed in the lock slots 36, thereby demountably locking the strips 18 to the swing valve 22. The abutting ends of the strips 18 furthermore provide means for closing off the respective open end of the swing valves 22, whereby any excess of foamed polyurethane material entering into the valve volume via aperture 40, is retained therein. The blocking of the open ends of the box-like swing valve 22 is shown more clearly in FIG. 6, which shows the lock tabs 54 lying against the edge walls 32 in locked relation against the side wall 30.

The locking action of the tabs 54, 56 is further seen in FIG. 5, which shows an assembled expendable form 16 disposed between skins 12, 14, during injection with the adhesive foamable polyurethane material, via an inwardly extending nozzle 60. The expendable forms 16 are held in place for example by a series of staples 62 stapled through the wall members 58 and into the skin 14. The skin 12 is then placed upon the forms 16 and weight is applied to hold the two skins together, spaced apart by the external width of the forms 16 which can be varied to obtain the thickness of panel 10 desired for the particular type of construction.

As shown in FIGS. 5 and 7 the nozzle 60 is inserted into the form 16 by simply pushing the end thereof into the valve seat aperture 44 and against the valve flapper 28. The flapper 28 is pivoted away from the aperture 44 and the nozzle 60 then pushes against the flap 42 to pivot it into the form volume. The flapper 28 which is longer than the width C of the edge walls 32, protrudes into the aperture 40 to provide a large enough opening for insertion of the nozzle 60. The nozzle 60 is inserted almost to the opposite side of the form 16, and as it is slowly withdrawn the polyurethane mixture is ejected therefrom, even distributed across the central region of the form volume.

As the nozzle is removed from the swing valve 22, the flap 42 and the valve flapper 28 tend to pivot back to respective side walls 30, particularly flapper 28 which seals off valve seat aperture 44. As the polyurethane mixture foams it expands to fill the form volume, and the buildup of foamed material tightly seals the flappper 28 against the aperture 44. As the material cures it adheres tightly to all exposed surfaces to form the lightweight panel 10 of the invention.

Although the invention has been described herein with respect to a particular embodiment and process, various modifications may be made within the spirit and scope of the invention. For example, the expendable forms 16 may be formed of one end-piece swing valve 22, the other valve 22 being replaced by a box-like end piece constructed similarly to the valves 22 herein described, but without the central apertures, or self-closing aperture means 24. Furthermore the various apertures and slots could be formed with other shapes, e.g., circular, oval, etc., and still perform their intended function. Accordingly, it is not intended to limit the invention except as defined in the following claims.

What is claimed is:

1. A rigid lightweight structural panel comprising:
a first and a second sheet of surface panels rigidly bonded together with preselected spacing by a plurality of discontinuous spaced cores formed of an adhesive foamable material foamed in situ within respective expendable form assemblies;
said second sheet of surface panel superimposed in register with and parallel to said first sheet and spaced evenly therefrom;
said plurality of expendable form assemblies being disposed between said sheets in selected spaced relation and determining said spacing therebetween;
the panel volume between the spaced sheets being only partially filled with the adhesive foamed cores and expendable form assemblies to define a discontinuous plurality of strips bonded in selected disposition between said sheets;
the combination of sheets, form assemblies, and cores being rigidly and integrally bonded together as a unit.

2. The structural panel of claim 1 wherein each of said expendable form assemblies comprises end pieces and lateral pieces formed of thin foldable material, said pieces demountably locked together via lock slots to provide a rigid, substantially rectangular, form of selected thickness and defining therewithin a selected volume and thus the boundaries of said adhesive foamed cores.

3. The structural panel of claim 2 wherein at least one of said end pieces is an end-piece swing valve having a self-closing aperture means disposed therein for access therethrough to the volume enclosed therein during fabrication of said panel.

4. The structural panel of claim 3 wherein said expendable form assemblies extend in spaced relation across one dimension of said superimposed sheets of surface facing, the ends of all said form assemblies terminating a short distance from the respective edges of the confining sheets to provide a panel supporting recess at both ends of the cores and along either side of said panel perpendicular to the orientation of said form assemblies.

5. The structural panel of claim 3 wherein said end-piece swing valve comprises a substantially rectangular hollow body formed of said thin foldable material, said body having lock slots formed at either end of one wall thereof adapted to demountably receive said lateral pieces in locking relation; and said self-closing aperture means includes a valve seat aperture formed in said body between the slots to provide access through the body, and an integrally formed valve flapper disposed to close off said valve seat aperture in self-closing relation.

6. The structural panel of claim 5 wherein said lateral pieces are formed of elongated strips of selected lengths of the foldable material, said strips having lock tabs formed in either ends thereof for demountable locking engagement with the lock slots of said end pieces and said end-piece swing valves to form the substantially rectangular expendable form assemblies.

7. The structural panel of claim 6 wherein the foldable material of said end and lateral pieces is cardboard.

8. The structural panel of claim 6 wherein said sheets of surface facing are wallboard.

9. The structural panel of claim 6 wherein said cores are formed of self-foaming, polyurethane material.

References Cited
UNITED STATES PATENTS

| | | | |
|---|---|---|---|
| 2,858,580 | 11/1958 | Thompson | 52—309 X |
| 3,174,887 | 3/1965 | Voelker | 264—45 X |
| 3,246,058 | 4/1966 | Voelker. | |

JOHN E. MURTAGH, *Primary Examiner.*